United States Patent [19]

Smith et al.

[11] Patent Number: 5,151,493

[45] Date of Patent: Sep. 29, 1992

[54] RADIATION-CURED FILM WEB AND A PROCESS FOR ITS PREPARATION

[75] Inventors: Hylton H. Smith, Prudhoe, England; Hans F. Huber, Lohmar, Fed. Rep. of Germany; Hartmut Müller, Little Silver, N.J.

[73] Assignee: Hüls Aktiengesellschaft, Marl, Fed. Rep. of Germany

[21] Appl. No.: 582,653

[22] Filed: Sep. 13, 1990

[30] Foreign Application Priority Data

Sep. 24, 1989 [DE] Fed. Rep. of Germany ....... 3931890

[51] Int. Cl.⁵ .............................................. C08G 63/20
[52] U.S. Cl. ................................... 528/272; 528/301; 528/302; 528/307; 528/308; 528/308.6; 525/437; 525/440; 525/445; 525/448; 522/178; 428/41; 428/345; 428/355; 428/480; 428/483
[58] Field of Search ............... 528/272, 301, 302, 307, 528/308, 308.6; 525/437, 440, 445, 448; 522/178; 428/41, 345, 355, 480, 483

[56] References Cited

U.S. PATENT DOCUMENTS

| | | | |
|---|---|---|---|
| 4,008,115 | 2/1977 | Fairbanks et al. | 156/267 |
| 4,022,926 | 5/1977 | Keough et al. | 428/41 |
| 4,219,596 | 8/1980 | Takemoto et al. | 428/41 |
| 4,253,899 | 3/1981 | Takemoto et al. | 156/277 |
| 4,664,965 | 5/1987 | Okita et al. | 428/143 |
| 4,818,610 | 4/1989 | Zimmerman et al. | 428/345 |

*Primary Examiner*—Samuel A. Acquah
*Attorney, Agent, or Firm*—Felfe & Lynch

[57] ABSTRACT

Radiation-cured film webs are prepared from copolyesters having terminal hydroxyl groups, not more than 90% of the hydroxyl groups having been replaced by acrylate or methacrylate groups. The copolyesters comprise at least two different dicarboxylic acids and have a copolymer chain which is branched due to the presence of more than bifunctional polyester components, and must have a glass transition temperature of −30° to +30° C. and an average molecular weight between 1,000 and 10,000. The film webs are particularly suitable as a backing carrier coated on one or both sides with pressure-sensitive adhesives in the manufacture of labels or as the backing carrier of adhesive tapes.

6 Claims, No Drawings

RADIATION-CURED FILM WEB AND A PROCESS FOR ITS PREPARATION

FIELD OF THE INVENTION

This invention relates to radiation-cured film webs which are useful as backing carriers coated on one or both sides with a pressure-sensitive adhesive in the preparation of labels or as the backing carrier of adhesive tapes.

BACKGROUND OF THE INVENTION

Self-stick labels made from a film web or backing carrier coated with a pressure-sensitive adhesive are usually composed of laminates of
1. a film web which acts as the imprintable backing carrier or visible web and is coated with a pressure-sensitive adhesive, and
2. a release web or protective layer for the adhesive, which is coated with a low-surface-tension substance such as a silicone, and allows the label to be detached smoothly when required for use.

Laminates of this type are prepared in the form of large rolls and are then cut into rolls of smaller width or into sheets of suitable size. The laminates are then imprinted, and the desired outline of the individual labels which are formed from the backing carrier is achieved by stamping, only the backing carrier and not the release web being cut. The surplus backing carrier material between the labels is then peeled away from the release web as a net and is discarded. The resulting roll comprising the release web and the individual labels attached thereto is fed into suitable machines, and the labels are applied at a high rate to the objects which are to be labeled.

Low-cost paper is suitable for use as the backing carrier only for low quality labels.

Metal foils or thermoplastic polymer films are therefore also used for the film web, but these materials also have certain deficiencies with respect to processing and/or stability. Films made of the frequently used plasticized polyvinyl chloride contain up to 20% by weight of a monomeric plasticizer and are difficult to imprint, shrink with aging and alter important properties due to the interaction of the pressure-sensitive adhesive with the plasticizer. Polyolefins, such as polyethylene or polypropylene, are likewise difficult to imprint. Cellulose acetate is not moisture-resistant and has poor dimensional stability. Polystyrene has inadequate processing properties and a low resistance to solvents. Polyethylene terephthalate has disadvantages with respect to imprintability and, because of its rigidity, is not sufficiently adaptable to other than flat or cylindrical surfaces.

It has therefore already been proposed to prepare backing carriers of, for example, self-stick labels from radiation-curable polymers (U.S. Pat. Nos. 4,008,115; 4,022,926; 4,219,596 and 4,253,899). However, radiation-curable polymers of this type yield highly cross-linked films which are therefore difficult to imprint, are too rigid and are often brittle. Zimmermann (U.S. Pat. No. 4,818,610 and published European Application 0,305,161) uses other acrylate polymers.

OBJECTS OF THE INVENTION

It is an object of this invention to provide a film web, in particular for the preparation of imprintable backing carriers, which is flexible, has a good appearance, is easily imprinted, is adaptable when applied mechanically to any shape object to be labeled, and especially exhibits good resistance against dirt, water, detergents, solvents, light and the like.

Quite generally, it is an object of the present invention to prepare a film web which combines the above enumerated desirable properties and is therefore eminently suitable for a great variety of applications.

DESCRIPTION OF THE INVENTION

It was known from our previous work in this field that acrylation of certain copolyesters results in pressure-sensitive adhesives. These radiation-cured copolyesters, which are disclosed in published European Application 0,207,257, are superior pressure-sensitive adhesives because of their very durable tack and superior adhesive strength.

On the other hand, if they are to be suitable as backing carriers for pressure-sensitive adhesives, film webs must not exhibit any tack and, in laminates for the preparation of labels must even exhibit anti-tack characteristics, that is, must not bond together under the action of pressure and elevated temperature.

It could therefore be assumed that the properties of such an adhesive and the properties of a film web which is suitable for use as a backing carrier for the adhesive are mutually exclusive. Acrylated copolyesters should therefore be completely unsuitable for use as film webs if non-tack and anti-tack characteristics are required.

We have surprisingly discovered that certain particular compositions of acrylated copolyesters are highly suitable for the preparation of film webs as long as certain conditions are observed.

Accordingly, the subject matter of the present invention are radiation-cured film webs which are particularly suitable as backing carriers for adhesive layers, their use as adhesive-coated backing carriers, and a process for the preparation of these film webs, particularly insofar as, pursuant to this process, film webs and a pressure-sensitive adhesive are jointly cured by radiation.

More particularly, the subject matter of the present invention is a radiation-cured film web composed of copolyesters having terminal hydroxyl groups and a limited proportion in the copolyester chain of more than bifunctional polyester components, or mixtures of such copolyesters, where said copolyesters have a glass transition temperature of between $-30°$ and $+30°$ C. and molecular weights between 1,000 and 10,000, the terminal hydroxyl groups of said copolyesters having been reacted with acrylate or methacrylate compounds and not more than 90% of the terminal hydroxyl groups having been converted into acrylate groups. These copolyesters exhibit the optimum properties, especially non-tack and anti-tack characteristics, at a certain optimum degree of acrylation, and are particularly suitable as a film web or carrier backing for labels and as a base for adhesive tapes coated on one or both sides with a pressure-sensitive adhesive, and in particular for adhesive tapes which do not give rise to delamination, that is, to tearing between the film carrier and the layer of pressure-sensitive adhesive. In this connection we have discovered that tack-free and non-blocking film webs are obtained if the conditions of the empirical formula $$A_{opt} = 50 + x - y$$

in which $A_{opt}$ is the optimum degree of acrylation as a percentage of the hydroxyl groups of the copolyester which had been reacted with acrylate groups or methacrylate groups x is the numerical value of the difference 298 minus the glass transition temperature Tg of the copolyester in °K., and y is the numerical value of the content of more than bifunctional components, calculated as trifunctional components, in mol. %, based on the total number of polyester components = 100 mol. %, multiplied by 2, are maintained, that is, that the degree of acrylation is kept within a variation range of ±10% of the optimum degree of acrylation $A_{opt}$. The deviation from $A_{opt}$ should be at most ±25%. If, however, a certain degree of tack or a lesser blocking performance can be tolerated, for example in the case of backing carriers having layers of adhesive on both sides or in laminates of the film web between metal layers, it is even possible to select a degree of acrylation differing by up to −25% from $A_{opt}$.

, the particular advantage of the film webs produced in accordance with the present invention is that he can prepare the film web on a suitable support by flat processing of the radiation-curable acrylated copolyesters. Of course, it is also possible to prepare and supply the film web separately as a radiation-cured backing carrier.

However, there are particular advantages for the manufacturer of labels in that he is able to prepare the film web as the backing carrier for the adhesive layer on the same industrial equipment, especially on the equipment used for preparing adhesive layers by spreading techniques. In such procedures the adhesive is preferably a pressure-sensitive adhesive. The backing carrier may simultaneously serve as the imprintable web, in which case it is also advantageous to use radiation-curable printing inks. It is then possible, in a single operation, to use radiation-curing to cure the backing carrier, the layer of pressure-sensitive adhesive and, if required, the printing ink.

Backing carriers of this type are prepared by processing the acrylated copolyesters in liquid form or, if necessary, after melting them at low temperatures.

If, for a variety of reasons it is preferable that the copolyester have a higher melting point, the flow point (ISO method 4625) should be at least 30° C. and preferably 40° C. This makes it possible, for example after melting the acrylated copolyester, to process the same within the range of, for example, 50° to 150° C., using casting machines, extruders, slot dies or roller coating equipment.

The objects of the present invention are achieved in particular by a radiation-cured and crosslinked film web which has a limited, relatively low crosslink density, but a high degree of crosslinking, that is, a high gel content. The relatively low crosslink density corresponds to a relatively low number of acrylate groups per macromolecule. A relatively low number of acrylate groups per macromolecule is achieved by several measures, namely by the selection of copolyesters having a molecular weight between 1,000 and 10,000, preferably between 2,000 and 5,000, which results in polyester chains of 1,000 to 10,000, and preferably 2,000 to 5,000 between the crosslink points formed by the acrylate groups. Furthermore, the number of terminal hydroxyl groups in the copolyester is preferably limited by keeping the hydroxyl numbers between 20 and 100, preferably between 35 and 90. This also limits the maximum number of acrylate groups after acrylation, the maximum possible degree of acrylation in any event being limited to about 90. However, the deliberate aim is to maintain a level of hydroxyl groups and to react 40 to 90% of terminal hydroxyl groups with acrylate compounds. Furthermore, the limited branching in the copolyester chains is in part the result of a limited number of copolyester components which are more than bifunctional, that is, trifunctional or optionally tetrafunctional compounds such as triols or tetraols and tricarboxylic acids or tetracarboxylic acids, being present.

The proportion of more than bifunctional components which are used as copolyester building blocks must be 1 to 10 mol. %, preferably 1.5 to 9 mol. %, and especially preferably 1.5 to 4 mol. %, relative to the total number of polyester building blocks = 100 mol. %. On the one hand, polyester components which are more than bifunctional give rise to chain branching, and the hydroxyl number does not reach the minimum which is achieved with linear copolyesters built up from only bifunctional components. On the other hand, the hydroxyl number is limited by the number of more than bifunctional components, and copolyester chains of the above-mentioned molecular weight are produced.

The copolyesters must have a certain composition of copolyester-forming components, that is, they must contain two different dicarboxylic acids of the aromatic dicarboxylic acid type, namely terephthalic acid, isophthalic acid or phthalic acid, and must be present in proportions of at least 25 mol. %, preferably at least 35 mol. %, of the total acid content. If the trifunctional acid trimellitic acid is present, it is to be counted as an aromatic carboxylic acid. The other dicarboxylic acids may be aliphatic or aromatic dicarboxylic acids. The diols may comprise one or preferably a plurality of aliphatic diols, and ether diols, such as diethylene glycol or triethylene glycol may also be incorporated.

An excess of diols in the condensation reaction mixture of the polyesters, which can subsequently be removed with the water formed by the polycondensation, produces hydroxy copolyesters whose terminal groups are predominantly hydroxyl groups. The hydroxyl numbers must be 20 to 100, preferably 35 to 85. The number of terminal carboxyl groups is small. The carboxyl number is below 3.0, preferably between 0.5 and 2.0.

The molecular weight must be between 1,000 and 10,000, preferably between 2,000 and 5,000, that is, within the range of true polymers. The proportion of low molecular weight components below M = 500 in the polyester must be extremely low.

The glass transition temperatures of the copolyesters are between −30° and +30° C., preferably between −20° and +20° C.

The reaction of the copolyesters with acrylate compounds or methacrylate compounds is carried out with a limited amount of acrylates, so that not more than about 90%, preferably 50 to 83%, of the hydroxyl groups of the copolyesters are replaced by terminal acrylate groups. In this process the optimum degree of acrylation is given by the empirical formula $$A_{opt} = 50 + x - y.$$

Like the degree of acrylation in general, the optimum degree of acrylation A is defined as the percentage of hydroxyl groups of the copolyesters which have reacted with acrylate groups.

The numerical value of x is calculated by taking the difference of 298 minus the value of the glass transition temperature Tg of the copolyester in °K.

The numerical value of y is the proportion of more than bifunctional components, calculated as trifunctional components, in mol. %, relative to the number of polyester components consisting of polyols and polycarboxylic acids = 100 mol. %, multiplied by 2.

In the Tables of the Examples the glass transition temperature Tg of the copolyester is given in °C., and the value of y is given as the proportion of trimethylolpropane (TMP).

If at low glass transition temperatures, optimum degrees of acrylation greater than 90 or 95 are calculated from the empirical formula, this is to be understood as meaning that the maximum possible acrylation is chosen or that the addition of a small amount of monomeric acrylate compounds is advantageous.

The acrylation, that is, the substitution of terminal hydroxyl groups by acrylate or methacrylate groups by reaction with acrylate or methacrylate compounds which comprise additional groups that are able to react with the hydroxyl groups, is effected in a separate reaction in known manner.

As previously indicated, preferably not more than 90%, and especially not more than 50 to 83% of the hydroxyl groups are reacted and converted into terminal acrylate or methacrylate groups in this reaction by means of the calculated amount of acrylate or methacrylate compounds, based on the total number of hydroxyl groups. Preferably 10 or more percent of the original hydroxyl group of the polyester are preserved in the acrylated polyester. Thus, the limited number of terminal acrylate groups and the degree of acrylation are used to predetermine and prefix the degree of curing by radiation of the produced film webs.

The functionality of the copolyesters is the average of the number of functional groups in the components which form the copolyester, that is, the diols or more than bifunctional alcohols and dicarboxylic acids or acids having more than two functional carboxyl groups, whereby a functionality of two will be formed by exclusive content of diols and dicarboxylic acids. A content of any hydroxyl, carboxyl or group having a function of three or higher will contribute to a rising functionality until an exclusive content of triols and tricarboxylic acids or monohydroxy dicarboxylic acid will result in a functionality of three.

This acrylation with acrylate or methacrylate compounds can be carried out in a manner corresponding to that described in published European Application No. 0,207,257 for other copolyesters with alkyl side-chains. The acrylation of the hydroxy copolyesters is preferably carried out with an aliphatic or optionally aromatic diisocyanate and a hydroxyalkyl acrylate, preference being given to aliphatic diisocyanates and hydroxyethyl acrylate. The two substances may be reacted in succession with the polyester. However, it is preferable to first react the isocyanate with the hydroxylalkyl acrylate in the mol ratio of 1:1 to 1:1.3, that is, with a small excess of the acrylate, to form an adduct and then to react this adduct with the copolyester.

It is preferable not to add to the acrylated copolyesters any unsaturated compounds having molecular weights of less than 500, such as low molecular weight acrylate compounds, that is, so-called reactive diluents like hexanediol diacrylate or trimethylol triacrylate.

The glass transition temperature of the copolyester is substantially unaffected by the acrylation and increases only slightly by about 5° to 10° C.

The viscosity $V_{100}$ of the acrylated copolyester must be between 5 and 200 Pa.s, so that it can be processed as a viscous liquid after heating and before curing. In the cured state, the gel content of the carrier layer must be 50 to 90%, the gel content being determined by extraction with a good solvent such as methyl ethyl ketone, ethyl acetate, methylene chloride or the like. The film web material is further characterized by a crosslink density corresponding to an acrylate equivalent weight of 1,000 to 5,000, preferably 1,000 to 3,000. In addition, the film webs are characterized by a surface tension above 40 mN/m.

The film webs or backing carriers are prepared at temperatures of 50° to 150° C., so that the viscosity is reduced to within the processability range of customary coating techniques. The copolyesters are applied to a support or to a film which is removed after the film web has been prepared or after the adhesive layer has been additionally applied.

The adhesive layer can be any adhesive layer, preferably a pressure-sensitive adhesive. Most preferred are pressure-sensitive adhesives which are described as macromers in European Patent Application 0,207,257.

The following Examples illustrate the present invention and will enable others skilled in the art to understand it more completely. It should be understood, however, that the invention is not limited solely to the particular Examples given below.

EXAMPLES

Preparation of Copolyesters PES 1 to PES 7

Polyesters PES 1 to PES 7 were prepared by mixing the starting materials and also the excess of ethylene glycol (MEG) which is needed for the polycondensation and which is removed during the condensation, and converting this mixture as described below for the case of PES 1.

For PES 1, a mixture of 9.57 kg of monoethylene glycol, 4.77 kg of neopentyl glycol, 3.45 kg of trimethylolpropane, 6.00 kg of adipic acid, 22.17 kg of isophthalic acid and 22.17 kg of terephthalic acid was heated quickly to 155° C. in an inert gas atmosphere in the presence of 50 g of octylene glycol titanate as a catalyst, whereupon water began to be split off from the reaction mixture. The temperature of the reaction mixture was increased to 250° C. over a period of 8 hours. The head temperature of a condenser connected to the reaction vessel was 102° to 1.04° C.

When the amount of water which was released had reached 5.96 kg, and 2.17 kg of excess diol had been distilled off, the temperature in the condenser fell to 85° C. To promote the condensation reaction, the pressure was reduced from 1,010 to 200 mbar at 250° C. over a period of 3.5 hours. When the acid number had fallen to 3 or below, the condensation was terminated.

The polyesters PES 2 to PES 7 were prepared in analogous manner with the amounts of starting materials which correspond to the mol. % data shown in Table I.

TABLE I

Composition of the polyesters

| Polyester | PSA | IPS mol % | TPS | AD/DDS | MEG mol % | NGP | HD | TMP | Tg °C. | flow point +) °C. | Hydroxyl No. |
|---|---|---|---|---|---|---|---|---|---|---|---|
| PES 1 | — | **) 30 | 30 | 40 AD | ***) 30 | 65 | — | 5 | 0 | 45 | 63 |
| PES 2 | 33.3 | 66.7 | — | — | 25 | 25 | 50 | 5 | 0 | 45 | 56 |
| PES 3 | 30 | 30 | — | 40 DDS | 20 | 45 | 30 | 5 | −24 | a) | 65 |
| PES 4 | 30 | 30 | — | 40 AD | 20 | 45 | 30 | 5 | −15 | a) | 62 |
| PES 5 | 35 | 30 | — | 35 AD | 15 | 30 | 50 | 5 | −21 | a) | 62 |
| PES 6 | — | 30 | 20 | 50 AD | 20 | 65 | 10 | 5 | −10 | 47 | 68 |
| PES 7 | — | 35 | 35 | 30 AD | — | 83 | — | 17 | +17 | 68 | 90 |

**) total of incorporated acids 100 mol %
***) total of incorporated polyols 100 mol %
PSA = Phthalic anhydride
IPS = Isophthalic acid
TPS = Terephthalic acid
AD = Adipic acid
DDS = Decanedicarboxylic acid
MEG = Monoethane glycol
NGP = Neopentyl glycol
HD = Hexanediol
TMP = Trimethylolpropane
+) flow point according to ring and ball Iso method 4225
a) distinctly cold flow

Acrylation of the Polyesters

First, 61.4 kg of isophorone diisocyanate (IPDI) and 38.6 kg of 2-hydroxyethyl acrylate (HEA) (mol ratio IPDI/HEA=1:1.2) were admixed, and the mixture was heated at 70° C. for 2 hours, which yielded an adduct of the two compounds.

Preparation of the Acrylated Polyesters

The acrylated polyesters shown in Table II were prepared from the copolyesters PES 1 to PES 7 shown in Table I by conversion with the above-mentioned adduct of isophorone diisocyanate and 2-hydroxyethyl acrylate in the presence of a photoinitiator. The amount of adduct was calculated on the basis of the hydroxyl number of each polyester so that 50%, 60% or 80% of the hydroxyl groups of the polyester were replaced by acrylate groups (designated by A 50, A 60 and A 80).

The acrylated copolyester PES I A 80 was prepared by heating 69 kg of the copolyester PES 1° to 120° at a pressure of 100 to 150 mbar while stirring. Thereafter, 29 kg of the above-mentioned adduct of isocyanate and acrylate were added over a period of 30 minutes, and the mixture was stirred for 1½ hours more under reduced pressure at 120° C. 2 kg of a photoinitiator were then added. The NCO-content was less than 0.2%.

The acrylated polyesters with acrylation degrees of A 50, A 60 and A 80 listed in Table II were prepared in analogous manner with the corresponding amounts of the adduct, calculated on the basis of the hydroxyl number of the particular polyester.

Table II shows the degree of acrylation A, the glass transition temperature Tg and the viscosities at 100 and 120 C of the acrylated polyesters.

TABLE II

Composition and properties of the liquid, acrylated polyesters

| Acrylated polyesters | Adduct | Proportion % | Tg. °C. x | $V_{100}$. Pa · s xx | $V_{120}$. Pa · s xx |
|---|---|---|---|---|---|
| PES 1 - A 60 | IDPI/HEA 1:1.2 | 60 | 11 | 27 | 7 |
| PES 1 - A 80 | IDPI/HEA 1:1.2 | 80 | 12 | 32 | 8 |
| PES 2 - A 60 | IDPI/HEA 1:1.2 | 60 | 13 | 34 | 7.6 |
| PES 3 - A 80 | IDPI/HEA 1:1.2 | 80 | −18 | 6 | 2 |
| PES 4 - A 60 | IDPI/HEA 1:1.2 | 60 | −6 | 10 | 3 |
| PES 5 - A 60 | IDPI/HEA 1:1.2 | 60 | 13 | 9 | 3 |
| PES 6 - A 80 | IDPI/HEA 1:1.2 | 80 | 0 | 18 | 6 |
| PES 7 - A 50 | IDPI/HEA 1:1.2 | 50 | | 81 | 16 |
| PES 7 - A 60 | IDPI/HEA 1:1.2 | 60 | +27 | 168 | 30 | x by DSC
xx by Brookfield viscometer

The properties listed in Table III characterize the utility of the film web, especially as a backing carrier for adhesive layers.

TABLE III

Properties of the cured, acrylated polyesters

| Property | PES 1-A 60 | PES 1-A 80 | PES 2-A 60 | PES 3-A 80 | PES 4-A 60 | PES 5-A 60 | PES 6-A 80 | PES 7-A 50 | PES 7-A 60 |
|---|---|---|---|---|---|---|---|---|---|
| Gel content (%) | 82 | 90 | 77 | 94 | 87 | 88 | 93 | 88 | 92 |
| MEK test (DS) | 23 | 48 | 68 | 30 | 70 | 55 | 46 | 65 | 80 |
| Surf. tension (mN/m) | 42 | 44 | 42 | 44 | 46 | 42 | 44 | 46 | 44 |
| Delamination | + | + | + | + | + | + | + | + | + |
| Anti-blocking | + | + | + | + | + | + | + | + | + |
| Tensile strength* (N/mm²) | 17 | 41 | 28 | 18 | 22 | 22 | 35 | 28 | 50 |
| Elongation at | 100 | 25 | 10 | 100 | 130 | 130 | 90 | 0 | 0 |

TABLE III-continued

| Property | Properties of the cured, acrylated polyesters | | | | | | | | |
|---|---|---|---|---|---|---|---|---|---|
| | PES 1-A 60 | PES 1-A 80 | PES 2-A 60 | PES 3-A 80 | PES 4-A 60 | PES 5-A 60 | PES 6-A 80 | PES 7-A 50 | PES 7-A 60 |
| break* (%) | | | | | | | | | |

*Extension rate DIN 53455 300 mm/min

The solvent resistance is characterized by the gel content achieved in crosslinking and by the MEK-test. The gel content is determined by subjecting the cured backing carrier to extraction with ethyl acetate. Values between 75 and 95% represent a good resistance to conventional solvents.

The MEK-test is performed by applying forward and backward strokes (double strokes, DS) of a ball of material which has been soaked in methyl ethyl ketone (MEK). Acceptable values are greater than 20 double strokes, and good values are more than 30 double strokes. In contrast thereto, the backing carriers of labels made from a polystyrene film already dissolved completely after fewer than 5 double strokes.

The surface tension, measured by wetting with liquids of known surface tension, must be at least 40 mN/m if good imprintability is to be achieved. The surface tension is essentially a function of the polymer material. For example, polyolefins and polystyrene have surface tension values below 35 mN/m and require corona treatment before imprinting.

Delamination is tested on finished labels or on strips of adhesive-coated backing carriers by application to various substrates such as glass, plastic, ceramic or metal; the absence of any delamination is indicated in Table III by a plus sign. Pressure-sensitive adhesives having a high peel strength can cause delamination, for example, on smooth substrates such as glass, which results in the pressure-sensitive adhesive remaining on the glass and detaching itself from the backing carrier when the label is removed. If pressure-sensitive adhesives of constant peel strength are used, delamination is therefore a suitability test for the backing carrier material; for example, delamination occurs frequently when the carrier material is polyethylene terephthalate.

Anti-blocking characteristics are tested by using as labels laminates which have been stored for a long time in the form of rolls of backing carriers having a layer of pressure-sensitive adhesives and a protective layer for the adhesives applied thereto, and the rolls are likely to be exposed to elevated temperatures or compressive loads. Anti-blocking characteristics are indicated if perfect separation of the layers of laminate from the rest of the roll is possible under a take-off tension typical of labeling machines.

Tensile strength and elongation at break are tested on carrier films of the film webs as an indication of the quality of the backing carrier material.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A radiation-cured film web composed of a copolyester containing a number of terminal hydroxyl groups which corresponds to hydroxyl numbers of 20 to 100 and 1 to 10 mol. % of trifunctional polyester components in the copolyester chain, based on the total number of polyester components being 100 mo. %, or mixture of copolyesters of this type, said copolyester having a glass transition temperature between −30° and +30° C., a flow point higher than 30° C., and an average molecular weight between 1,000 and 10,000, the terminal hydroxyl groups of said copolyester having been reacted with an acrylate or methacrylate compound, 35 to 90% of the terminal hydroxyl groups having been converted to acrylate groups, in which the optimum degree of acrylation is defined by the empirical formula $$A_{opt} = 50 + x - y$$

wherein $A_{opt}$ is the optimum degree of acrylation as a percentage of the hydroxyl groups of the copolyester which have been reacted with acrylate or methacrylate groups, x is the numerical value of the difference of 298 minus the glass transition temperature Tg of the copolyester in °K., and y is the numerical value of the proportion of trifunctional polyester components, in mol. %, based on the total number of polyester components being 100 mol. %, multiplied by 2.

2. A film web of claim 1, wherein the flow point of the copolyester is higher than 40° C.

3. A film web of claim 1, wherein the number of terminal hydroxyl groups in the copolyester corresponds to hydroxyl numbers of 35 to 85.

4. A film web of claim 1, wherein the acrylated copolyester contains not more than 15% by weight of unsaturated compounds having molecular weights below 500.

5. The method of preparing a film web as a backing carrier having applied thereto an adhesive layer as in claim 1, which comprises applying to said film web a coating of at least one copolyester which has been reacted with an acrylate or methacrylate compound, the application of said coating being carried out at elevated temperature by the same technique as the application of adhesive layers.

6. The method of preparing a backing carrier having an adhesive layer as in claim 1, wherein the copolyester which has been reacted with a methacrylate compound is applied in a sheet-like form to produce the backing layer, the adhesive layer is applied to the solidified backing carrier, and then the two layers are joints cured by radiation.

* * * * *

UNITED STATES PATENT AND TRADEMARK OFFICE
CERTIFICATE OF CORRECTION

PATENT NO. : 5,151,493
DATED : September 29, 1992
INVENTOR(S) : Hylton H. Smith et al It is certified that error appears in the above-identified patent and that said Letters Patent is hereby corrected as shown below:

Column 3, line 22, before "," insert --For the producer of labels--.

Column 6, line 48, "6.00" should read --26.00--.

Column 6, line 57, "1.04" should read --104--.

Column 6, line 59, "5.96" should read --15.96--.

Column 10, line 14, claim 1, "mo." should read --mol--.

Signed and Sealed this

Twenty-second Day of February, 1994

Attest:

BRUCE LEHMAN

Attesting Officer     Commissioner of Patents and Trademarks